United States Patent [19]

Reche

[11] Patent Number: 4,765,658
[45] Date of Patent: Aug. 23, 1988

[54] FLUID BOX FOR A HEAT EXCHANGER, IN PARTICULAR FOR A MOTOR VEHICLE, AND A RAPID ACTION COUPLING FOR CONNECTING IT TO A FLUID CIRCUIT

[75] Inventor: Christian Reche, Maintenon, France
[73] Assignee: Valeo, Paris, France
[21] Appl. No.: 939,122
[22] PCT Filed: Mar. 20, 1986
[86] PCT No.: PCT/FR86/00098
   § 371 Date: Nov. 20, 1986
   § 102(e) Date: Nov. 20, 1986
[87] PCT Pub. No.: WO86/05580
   PCT Pub. Date: Sep. 25, 1986

[30] Foreign Application Priority Data

Mar. 21, 1985 [FR] France ............................. 85 04213

[51] Int. Cl.⁴ .......................................... F16L 39/00
[52] U.S. Cl. ................................ 285/137.1; 285/150; 285/921
[58] Field of Search .................. 285/133.1, 137.1, 138, 285/41, 131, 921, 132, 150; 165/175, 176

[56] References Cited

U.S. PATENT DOCUMENTS

| | | |
|---|---|---|
| 1,651,875 | 12/1927 | Ercanbrock ........................ 165/176 |
| 1,871,421 | 8/1932 | Muhlhauser et al. . |
| 2,798,745 | 7/1957 | Nelson ......................... 285/137.1 X |
| 3,177,896 | 4/1965 | Mosher et al. . |
| 3,211,178 | 10/1965 | Kiszko . |
| 3,938,233 | 2/1976 | Cannon . |
| 4,162,041 | 7/1979 | Hane . |
| 4,328,859 | 5/1982 | Bouvot . |
| 4,479,668 | 10/1984 | Jacquet ............................ 285/137.1 |

FOREIGN PATENT DOCUMENTS

| | | |
|---|---|---|
| 0029859 | 6/1981 | European Pat. Off. . |
| 0046726 | 3/1982 | European Pat. Off. . |
| 0082950 | 7/1983 | European Pat. Off. . |
| 191169 | 8/1957 | Fed. Rep. of Germany ... 285/133.1 |
| 192141 | 9/1957 | Fed. Rep. of Germany ... 285/133.1 |
| 192139 | 9/1957 | Fed. Rep. of Germany ... 285/133.1 |
| 1065308 | 5/1954 | France ............................. 285/133.1 |
| 1116161 | 5/1956 | France . |
| 1377585 | 9/1964 | France . |
| 1529728 | 5/1968 | France . |
| 1531455 | 7/1968 | France . |
| 2312719 | 12/1976 | France . |
| 2341261 | 9/1977 | France . |
| 2444580 | 7/1980 | France . |
| 330990 | 6/1958 | Switzerland ........................ 165/176 |
| 716771 | 10/1954 | United Kingdom ................. 285/132 |

Primary Examiner—Dave W. Arola
Attorney, Agent, or Firm—Dennison, Meserole, Pollack & Scheiner

[57] ABSTRACT

The invention relates to a rapid action coupling comprising two elements (10, 12) one of which is integrally molded with a fluid box of a heat exchanger, and the other of which includes two ducts (52, 54) for connection to a fluid circuit.

The two elements (10, 12) each comprise, at their connection ends, two coaxial tubes (30, 32, and 48, 50) which engage in sealed manner in one another.

The invention is particularly applicable to providing rapid coupling to the heat exchanger in the liquid circuit of a motor vehicle.

20 Claims, 3 Drawing Sheets

4,765,658

FLUID BOX FOR A HEAT EXCHANGER, IN PARTICULAR FOR A MOTOR VEHICLE, AND A RAPID ACTION COUPLING FOR CONNECTING IT TO A FLUID CIRCUIT

TECHNICAL FIELD

The invention relates to a fluid box for a heat exchanger, in particular for a motor vehicle, and to a rapid action coupling for connecting it to a fluid circuit.

PRIOR ART

A heat exchanger, in particular one intended for fitting to a motor vehicle, generally comprises at least one fluid box provided with a fluid inlet or outlet tube which is connected in sealed manner to a flexible hose (called "Durite" in France) connected to the fluid circuit, for example the liquid circuit for cooling the engine of a motor vehicle. Another fluid outlet or inlet tube, respectively, is provided on the same fluid box or on the other fluid box, depending on the type of heat exchanger, and is connected in sealed manner by another flexible hose to the fluid circuit.

Each of these flexible hoses is force-fitted at one end over the corresponding end of the tube and is held in place on the tube by means of a clamping collar which is fitted around said end of the flexible hose and which firmly clamps the tube.

These operations of fitting flexible hoses over tubes and of placing clamping collars are relatively long and inconvenient to perform on a motor vehicle assembly line. Motor vehicle manufacturers currently desire to have means available for facilitating these operations and for greatly reducing their duration.

SUMMARY OF THE INVENTION

The invention provides a simple, effective and rapid solution to this problem.

To this end, the invention provides a fluid box for a heat exchanger, in particular for a motor vehicle, which comprises a fluid inlet tube and a fluid outlet tube which are integrally formed with the fluid box and characterized in that said tubes are coaxial, at least over a portion of their lengths from their free ends.

At their ends connected to the fluid box, these two tubes may be coaxial or they may each be outside the other, as the case may be.

Having the fluid box tubes coaxial at their free ends makes it possible to connect them to the flexible hoses of a fluid circuit by means of a rapid-action coupling which is characterized in that it comprises an element formed with two fluid passages which are separate from each other and which are suitable for being connected in sealed manner to the free ends of the coaxial tubes of the fluid box, with the two fluid passages of said element being constituted by two tubes which are coaxial at the connection end of the element and by two ducts which lie outside each other at the opposite end of said element, each of these two ducts being suitable for connection to a respective flexible hose for fluid feed or return.

This element is advantageously of the type for locking to the free ends of the coaxial tubes of the fluid box by a snap-fastening.

Thus, by virtue of the invention, the operations of connecting a heat exchanger to a fluid circuit on a motor vehicle assembly line are limited to a single operation of coupling the two elements of a rapid action coupling, one of which elements is formed by the coaxial tubes of the fluid box and the other by the element connected to the above-specified flexible hoses.

According to another characteristic of the invention, the coaxial tubes of the fluid box and of the said element are engaged in sealed manner in each other and are centered relative to each other at their ends.

The portions of the coaxial tubes which are engaged in each other have annular spaces provided in their respective cylindrical walls for receiving sealing rings.

The element connected to the flexible hoses includes snap-fastening locking means suitable for co-operating with complementary means provided on one of the coaxial tubes of the fluid box, said means comprising, for example, a peg or stud formed to project from the outside tube of said element and suitable for being engaged in an L-shaped notch in the free end of the outer coaxial tube of the fluid box.

Advantageously, this element is made in the form of a one-piece molding, for example of plastic material.

BRIEF DESCRIPTION OF THE DRAWINGS

In the following description given by way of example, reference is made to the accompanying drawings, in which.

BEST METHOD OF PERFORMING THE INVENTION

Figure 1:
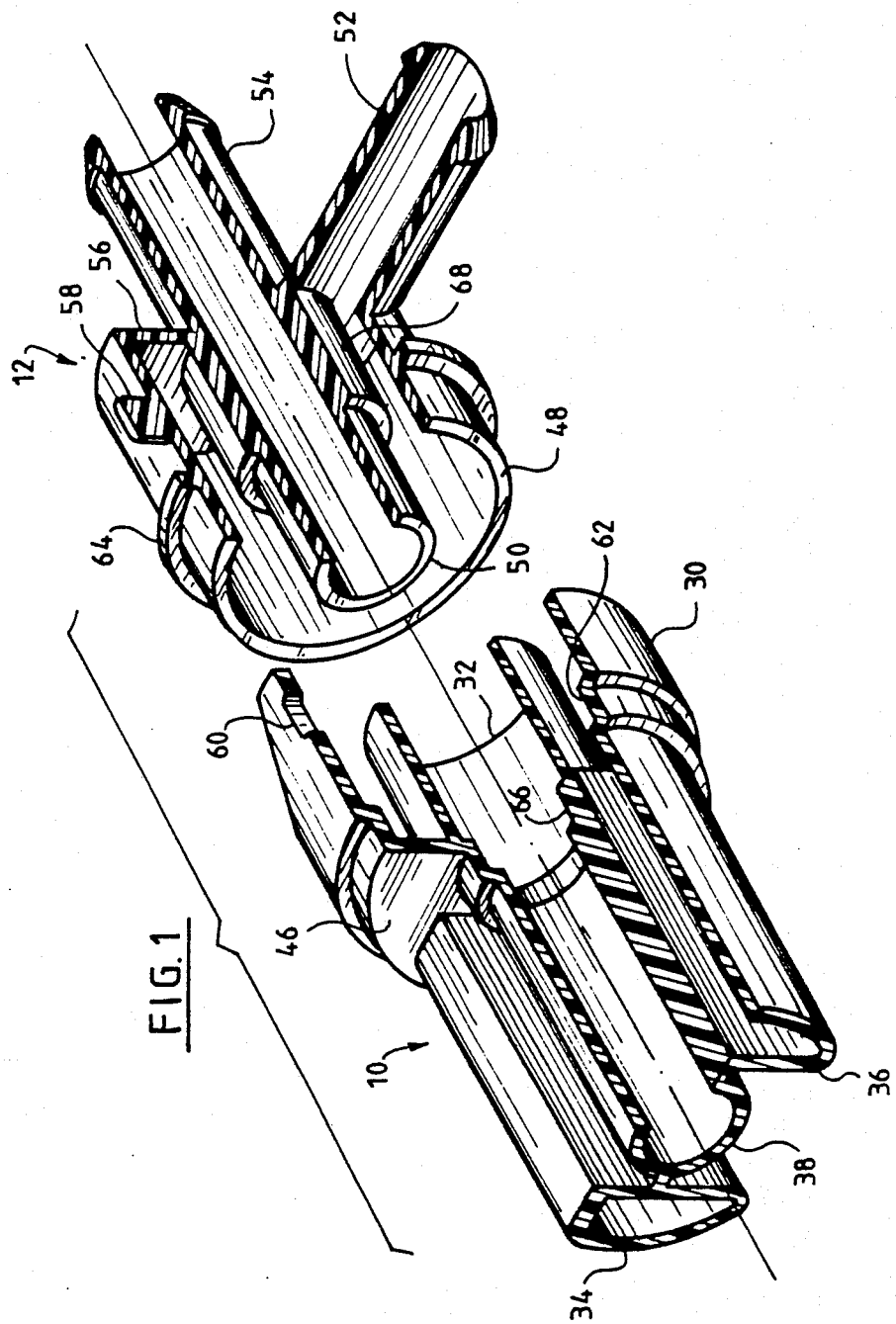
FIG. 1 is a partially cutaway exploded perspective view of the two elements of a rapid action coupling in accordance with the invention.

The rapid action coupling shown in the drawings comprises two molded plastic material elements 10 and 12, one of which is connected to the water box of a heat exchanger and the other of which is intended to be connected by two flexible hoses (not shown) to the cooling liquid circuit of a motor vehicle internal combustion engine.

Figure 2:
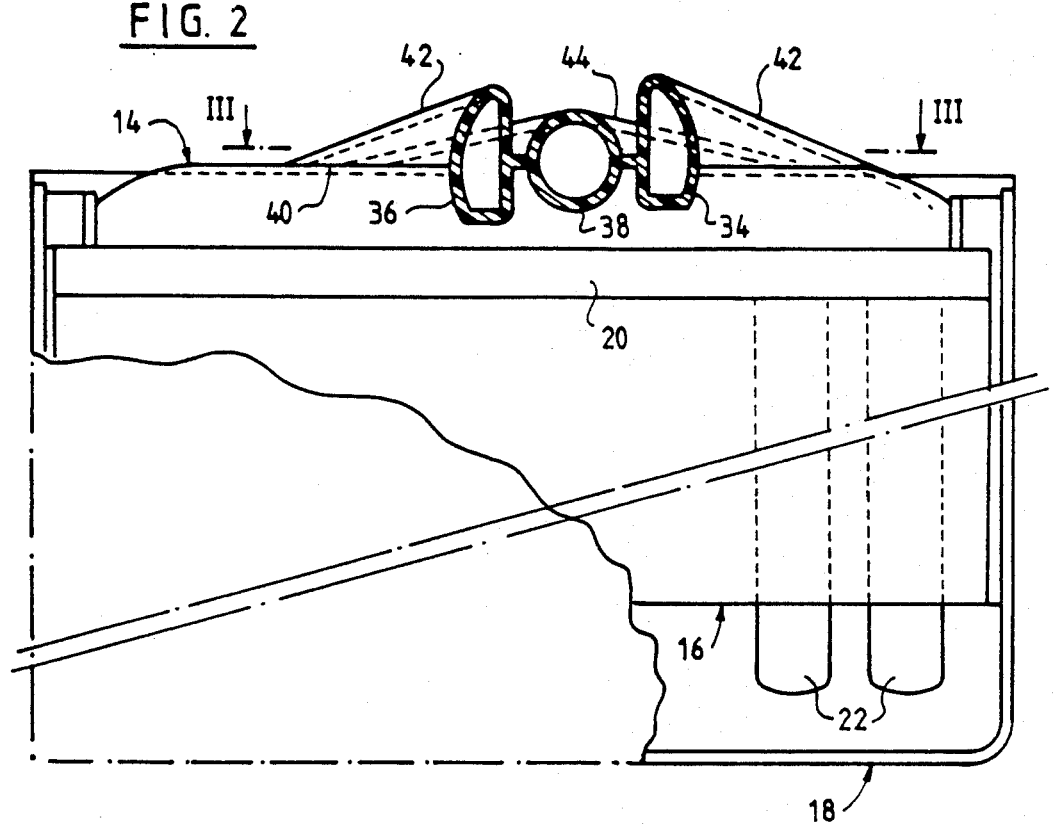
FIG. 2 is a diagrammatic front view in partial section of a heat exchanger including a water box in accordance with the invention.
Figure 3:
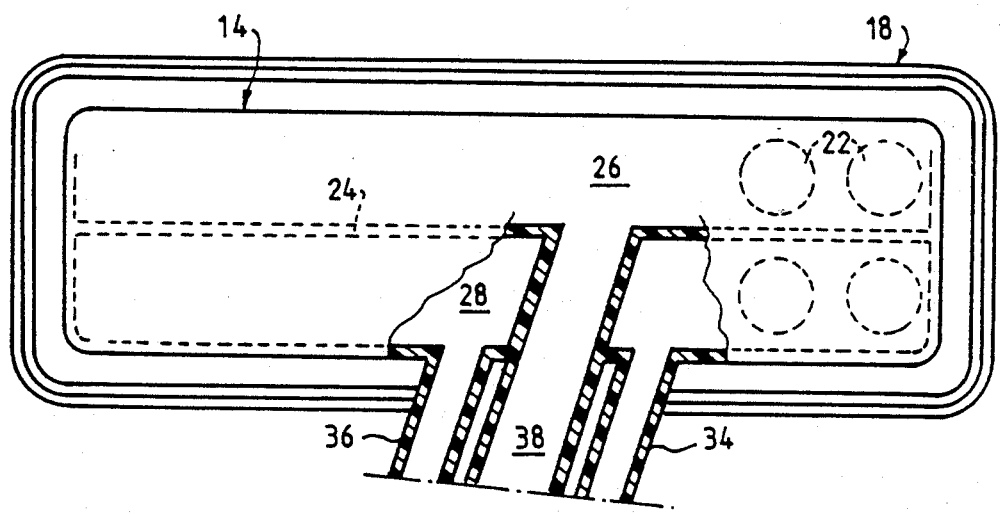
FIG. 3 is a plan view of the heat exchanger, with the two tubes of the water box being shown in section on a line III—III of FIG. 2.

The element 10 of which only a part is shown in FIG. 1 is integrally molded with a water box 14 of the heat exchanger 16 which is shown mounted in a housing 18 in FIGS. 2 and 3.

This heat exchanger 16 is of the type comprising a single water box 14 mounted in conventional manner by means of a perforated plate 20 on one end of a bundle of U-shaped tubes 22.

A longitudinal partition 24 divides the internal volume of the water box 14 into two chambers 26 and 28 which are separated from each other in sealed manner when the water box 14 is mounted on the perforated plate 20, with the longitudinal partition 24 extending between the ends of each of the tubes 22 so that the two chambers 26 and 28 of the water box are interconnected by the tubes 22.

The heat exchanger 16 is fed with liquid by the element 10 of the rapid action coupling, which element comprises two separate liquid passages leading to the chambers 26 and 28 respectively of the water box 14. These two liquid passages are formed by two tubes 30 and 32 which are cylindrical and coaxial at the free end of the element 10 and by ducts 34, 36, and 38 at the opposite end of the element, which ducts are connected to the water box 14, said ducts 34, 36, and 38 being parallel to one another and outside one another, with the duct 38 being formed by extending the inner tube 32 until it reaches the chamber 26 of the water box 14, while the ducts 34 and 36 open out at one end into the outer tube 30 and at their opposite ends into the chamber 28 of the water box 14.

As can be seen in FIG. 2, the horizontal mid-plane through the ducts 34, 36, and 38 is substantially tangential to the curved wall 40 of the water box, which includes projecting portions 42 and 44 which slope into the top portions of the ducts 34, 36 and 38 respectively, in order to facilitate the distribution of the liquid passing along the ducts 34, 36 and 38 in the chambers 28 and 29 of the water box.

The coaxial tubes 30 and 32 of the elements 10 are interconnected by a transverse wall 46 at a certain distance from their free ends, said wall 46 extending around the inner tube 32 as far as the wall of the outer tube 30 and also being connected to the ducts 34 and 36 which open out into the outer tube 30 via orifices molded through said transverse wall 46.

The other element 12 of the rapid action coupling in accordance with the invention is also made as a one-piece molding, in particular of plastic material, and comprises two separate liquid passages which are formed at the connection end of the element 12 by two coaxial tubes 48 and 50, and which are formed at the opposite end of said element 12 by two ducts 52 and 54 which are outside each other and each of which is intended to receive the end of a flexible hose (not shown).

The duct 52 extends perpendicularly to the axis of the tubes 48 and 50 in the example shown in FIG. 1 and opens out into the outer tube 48, while the other duct 54 is formed along an axial extension of the inner tube 50.

Like the element 10 of the coupling, the coaxial tubes 48 and 50 are connected to each other at a distance from their free ends by a transverse wall 56 which surrounds the inner tube 50.

The element 12 also includes a peg or stud 58 projecting radially from the outer tube 48 and suitable for engaging as a snap-fit in a notch 60 which is shown in part at the free end of the outer tube 30 of the element 10. The sealed connection between the elements 10 and 12 of the coupling is described in greater detail below with reference to FIGS. 4 to 6.

The elements of the rapid action coupling shown in these figures differ from those of the coupling shown in FIG. 1 solely in the orientation of the ducts 52 and 54 of the element 12, with the duct 52 being perpendicular to the common axis of the elements 10 and 12 as in FIG. 1, while the duct 54 extends obliquely relative to said axis, instead of being aligned on said axis. The elements of the rapid action coupling and the component parts thereof are thus designated by the same references both in FIG. 1 and in FIGS. 4 to 6.

Figure 4:
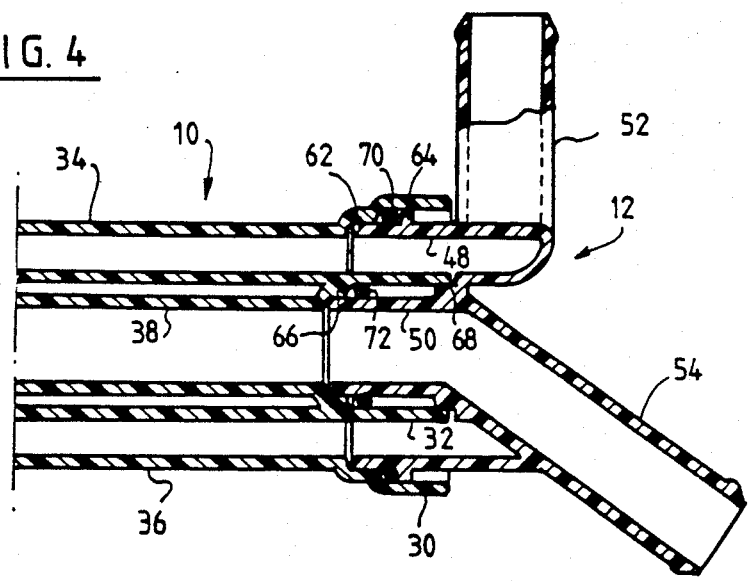
FIG. 4 is a diagrammatic axial section through a rapid action coupling in accordance with the invention and shown in the assembled state.

FIG. 4 shows the coupling in the assembled state. The elements 10 and 12 of the coupling are connected together in sealed manner and are locked in the connected position by a snap fastening.

The coaxial tubes 48 and 50 of the element 12 are intended to be engaged in the tubes 30 and 32 respectively of the element 10. These tubes have cylindrical bearing surfaces which are internal or external as the case may be enabling the ends of the tubes to be centered in the tubes in which they are engaged. In greater detail, the outer tube 30 of the element 10 comprises, at a distance from its free end, an internal cylindrical bearing surface 62 having an inside diameter which is very slightly larger than the otuside diameter of the free end of the outer tube 48 of the element 12. This outer tube 48 of the element 12 comprises, at a distance from its free end, a peripheral rim 48 whose outside diameter is very slightly smaller than the inside diameter of the free end of the outside tube 30 of the element 10.

Similarly, the inside tube 32 of the element 10 comprises, at a distance from its free end, an internal cylindrical bearing surface 66 whose inside diameter is very slightly greater than the outside diameter of the free end of the inner tube 50 of the element 12. This inner tube 50 itself comprises, at a distance from its free end, an external cylindrical bearing surface 68 whose outside diameter is very slightly smaller than the inside diameter of the free end of the inner tube 32 of the element 10. Thus, when the two elements 10 and 12 are engaged in each other, the free end of the outer tube 30 of the element 10 is centered in and pressed against the peripheral rim 64 of the outer tube 48 of the element 12, while the free end of said tube 48 is centered inside the cylindrical bearing surface 62 of the outer tube 30 of the element 10. Similarly, the free end of the inner tube 32 of the element 10 is centered in and bears against the cylindrical bearing surface 68 of the inner tube 50 of the element 10, and the free end of said tube 50 is centered inside the cylindrical bearing surface 66 of the tube 32 of the element 10.

As can be seen in FIG. 4, the inside diameter of the outer tube 30 of the element 10 is larger than the outside diameter of the outer tube 48 of the element 12, leaving an annular space between the two tubes for receiving a sealing ring 70 which is located between the rim 64 of the tube 48 and the internal cylindrical bearing surface 62 of the tube 30.

Likewise, the inside diameter of the inner tube 32 of the element 10 is greater than the outside diameter of the inner tube 50 of the element 12, thereby leaving an annular gap between the two tubes for receiving a sealing ring 72. The sealing ring 72 is placed around the inner tube 50 between the cylindrical bearing surface 68 thereof and the cylindrical bearing surface 66 of the tube 32.

When the two elements 10 and 12 of the rapid action coupling are engaged in each other as shown in FIG. 4, the separation between the liquid passages formed through the coupling is completely watertight, with the liquid arriving, for example, via the duct 54, passing into the inner tube 50 and then into the duct 38, and returning via the ducts 34 and 36, passing through the outer tube 48 and leaving via the duct 52, or vice-versa. Not only are the liquid passages separated from each other in watertight manner, but also, none of the walls delimiting the passages is in contact with the liquid on both faces, thereby preventing the plastic material being hydrolized by the liquid and thus avoiding deformation of the walls.

Figure 6:
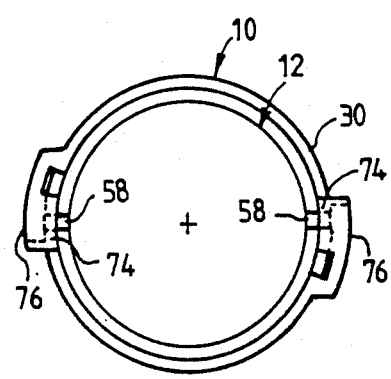
FIG. 6 is a simplified side view of the coupling.
Figure 5:
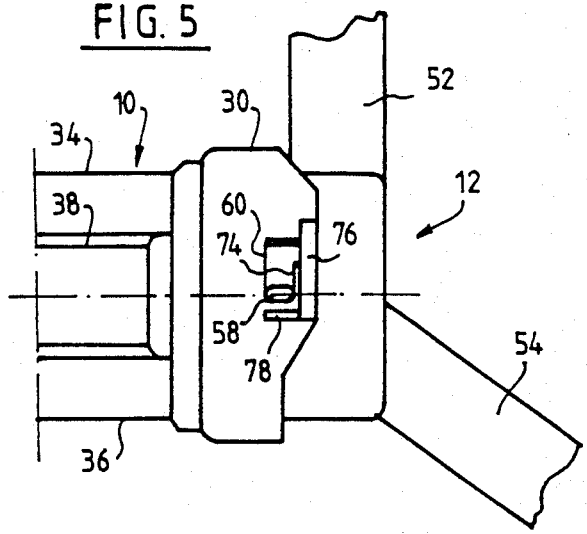
FIG. 5 is a fragmentary view of the coupling.

The two elements 10 and 12 of the coupling are held coupled to each other by snap-fastening locking means, which are shown partially in FIG. 1 and more completely in FIGS. 5 and 6. These means comprise, for example, two pegs or studs 58 projecting from the outside surface of the outer tube 48 of the element 12, with the two pegs or studs 58 being diametrically opposed and formed behind the rim 64 of the outer tube 48.

In order to receive these pegs or studs 58, the free end of the outer tube 30 of the element 10 includes two L-shaped notches 60 each having one branch parallel to the common axis of the tubes 30 and 32, and having its other branch perpendicular to the first branch and terminating in a portion whose size parallel to the axis is substantially equal to the corresponding size of the peg or stud 58, while the remainder of said other branch is of slightly narrower width. Thus, when the elements 10 and 12 are coupled together, the studs 58 are inserted into the first branches of the notches 60, and then by rotating the element 12 relative to the element 10 through a small angle (for example about 10° to 15°) the studs are brought to the ends of the second branches of the notches 60. During this rotation, the studs 58 are elastically deformed since their axial size is slightly greater than the size of the second branches of the notches 60; then on arriving at the ends of the second branches which are of slightly larger axial size than the pegs 58 they return to their initial un-stressed state.

In order to avoid accidentally unlocking the two elements by elastic deformation of the free edges 74 of the second branches of the notches 60, these free edges 74 are integrally molded with an element 76 which is substantially U-shaped and which covers the first branches of the notches 60 and which connects with the outside surface of the tube 30 beyond said first branches of the notches 60. In order to increase the rigidity of the assembly, the feet of these elements 76 may be connected to ribs 78 extending parallel to the axis and projecting from the outside face of the outer tube 30, as shown in FIG. 5.

It will be understood that a coupling in accordance with the invention provides a simple, rapid acting and effective connection between a water box 14 of a heat exchanger and a liquid circuit. All that needs to be done is to engage the elements 10 and 12 of the coupling into each other and then to rotate the element 12 relative to the element 10 in order to lock the two elements together.

The element 12 may be delivered to motor manufacturers already fitted with the above-mentioned flexible hoses. These hoses are mounted on the ducts 52 and 54 of the element 12 in conventional manner, i.e. by being force-fitted over these ducts and then by being held in place by clamping collars or by any other analogous means. On vehicle assembly lines, all that remains to be done is to engage the two elements 10 and 12 of a coupling in each other and to lock them together by their snap fastening.

The invention is applicable not only to connecting water boxes of a heat exchanger to a liquid circuit, but also whenever four fluid-passing ducts need to be interconnected in pairs.

I claim:

1. A fluid box for a heat exchanger, in particular for a motor vehicle, respective fluid inlet and outlet tubes integrally formed with the fluid box, said tubes (30, 32) terminating in free outer ends outward of said fluid box and being coaxial over at least a portion of their length from their free ends, the tubes being parallel and outside each other adjacent the fluid box (14), one (30) of the two tubes which is outside the other tube in their coaxial free end portions being split into two ducts (34, 36) via which the outer tube is connected to the fluid box (14).

2. A fluid box according to claim 1, characterized in that the two ducts (34, 36) are parallel and outside each other and outside the other tube (32, 38).

3. A fluid box according to claim 2, characterized in that the coaxial portions of the two tubes are formed by two coaxial cylindrical walls which are connected to each other at a distance from their free ends by a transverse wall (46) surrounding the inner tube (32) and from which there extend the two ducts (34, 36) connecting the fluid box (14) to the outer tube (30).

4. A rapid action coupling for coupling a fluid box to a fluid circuit in accordance with claim 3, including an element (12) formed with two fluid passages which are separate from each other and have free ends for connection in a sealed manner to the coaxial free ends of the tubes (30, 32) of the fluid box (14), the two fluid passages of the element (12) comprising two coaxial tubes (48, 50) having free ends defining the free ends of the fluid passages, and two ducts (52, 54) which are outside each other at the opposite ends of said fluid passages, said two ducts of the element (12) being connectable to respective flexible hoses for fluid feed or return.

5. A coupling according to claim 4, characterized in that the two coaxial tubes (48, 50) of the element (12) are formed by two coaxial walls which are interconnected, at a distance from their free ends, by an annular wall (56) surrounding the inner tube (50), with one of said element ducts opening out into the outer element tube (48) level with said annular wall (56), while the other outer element duct (54) is formed by an extension of the inner element tube (50).

6. A coupling according to claim 5, characterized in that the coaxial portions of the tubes (30, 32) of the fluid box and the coaxial tubes (48, 50) of said element (12) are suitable for being engaged in one another in sealed manner and for being centered in one another at their ends.

7. A coupling according to claim 6, characterized in that one of the two outer tubes of the fluid box and of said element (12) which is engageable in the other outer tube of said element and said fluid box is received at its free end in a cylindrical bearing surface (62) of said other tube and comprises, at a distance from its free end, an outer cylindrical bearing surface (64) for centering the free end of said other tube.

8. A coupling according to claim 6, characterized in that one of the two inner tubes (32, 50) of the fluid box and of said element (12) which is engageable in the other inner tube of said element and said fluid box, is received at its free end in a cylindrical bearing surface (66) of said other tube and comprises, at a distance from its free end an outer cylindrical bearing surface (68) for centering the free end of said other tube.

9. A coupling according to claim 8, characterized in that the portions of the inner tubes which are engaged in each other leave an annular space between their respective cylindrical walls for receiving a sealing ring.

10. A coupling according to claim 9, characterized in that said element (12) includes snap-fastening locking means (58) suitable for co-operating with complementary means (60) provided on one of the coaxial portions of the tubes (30, 32) of the fluid box, when said element (12) is connected to said fluid box tubes.

11. A coupling according to claim 10, characterized in that said locking means comprise a stud or peg (58) formed to project from the outer tube (48) of said element (12) and an L-shaped notch (60) at the free end of the outer tube (30) of the fluid box (14).

12. A coupling according to claim 11, characterized in that said element (12) is integrally molded as a single part.

13. A fluid box for a heat exchanger, in particular for a motor vehicle, respective fluid inlet and outlet tubes integrally formed with the fluid box, said tubes (30, 32) terminating in free outer ends outward of said fluid box and being coaxial over at least a portion of their length from their free ends, one (30) of the two tubes which is outside the other tube in their coaxial free end portions being split into two ducts (34, 36) via which the outer tube is connected to the fluid box (14).

14. A fluid box according to claim 13, characterized in that the two ducts (34, 36) are parallel and outside each other and outside the other tube (32, 38).

15. A fluid box according to claim 13, characterized in that the coaxial portions of the two tubes are formed by two coaxial cylindrical walls which are connected to each other at a distance from their free ends by a transverse wall (46) surrounding the inner tube (32) and from which there extend the two ducts (34, 36) connecting the fluid box (14) to the outer tube (30).

16. A fluid box for a heat exchanger, in particular for a motor vehicle, respective fluid inlet and outlet tubes integrally formed with the fluid box, said tubes (30, 32) terminating in free outer ends outward of said fluid box and being coaxial over at least a portion of their length from their free ends, and a rapid action coupling for coupling the fluid box to a fluid circuit including an element (12) formed with two fluid passages which are separte from each other and have free ends for connection in a sealed manner to the coaxial free ends of the tubes (30, 32) of the fluid box (14), the two fluid passages of the element (12) comprising two coaxial tubes (48, 50) having free ends defining the free ends of the fluid passages, and two ducts (52, 54) which are outside each other at the opposite ends of said fluid passages, said two ducts of the element (12) being connectable to respective flexible hoses for fluid feed or return.

17. A coupling according to claim 16, characterized in that the two coaxial tubes (48, 50) of the element (12) are formed by two coaxial walls which are interconnected, at a distance from their free ends, by an annular wall (56) surrounding the inner tube (50), with one of said element ducts opening out into the outer element tube (48) level with said annular wall (56), while the other outer element duct (54) is formed by an extension of the inner element tube (50).

18. A coupling according to claim 16, characterized in that the coaxial portions of the tubes (30, 32) of the fluid box and the coaxial tubes (48, 50) of said element (12) are suitable for being engaged in one another in sealed manner and for being centered in one another at their ends.

19. A coupling according to claim 18, characterized in that one of the two inner tubes (32, 50) of the fluid box and of said element (12) which is engageable in the other inner tube of said element and said fluid box, is received at its free end in a cylindrical bearing surface (66) of said other tube and comprises, at a distance from its free end, an outer cylindrical bearing surface (68) for centering the free end of said other tube.

20. A coupling according to claim 18, characterized in that one of the two outer tubes of the fluid box and of said element (12) which is engageable in the other outer tube of said element and said fluid box, is received at its free end in a cylindrical bearing surface (62) of said other tube and comprises, at a distance from its free end, an outer cylindrical bearing surface (64) for centering the free end of said other tube.

* * * * *